United States Patent
Greulich-Hickmann et al.

(10) Patent No.: US 6,799,437 B2
(45) Date of Patent: Oct. 5, 2004

(54) METHOD FOR THE HOT SHAPING OF MOLTEN GOBS

(75) Inventors: Norbert Greulich-Hickmann, Mainz (DE); Andreas Langsdorf, Ingelheim (DE); Christian Kunert, Mainz (DE); Carsten Weinhold, Nieder-Olm (DE)

(73) Assignee: Schott Glas, Mainz (DE)

( * ) Notice: Subject to any disclaimer, the term of this patent is extended or adjusted under 35 U.S.C. 154(b) by 227 days.

(21) Appl. No.: 10/144,009

(22) Filed: May 13, 2002

(65) Prior Publication Data

US 2002/0194870 A1 Dec. 26, 2002

(30) Foreign Application Priority Data

May 23, 2001 (DE) .......................................... 101 25 107
Sep. 21, 2001 (DE) .......................................... 101 46 510

(51) Int. Cl.$^7$ .............................................. C03B 40/04
(52) U.S. Cl. ............................................ 65/25.1; 65/26
(58) Field of Search ................................ 65/25.1, 182.1, 65/182.2, 26, 304; 226/97, 97.3; 406/88–89, 91

(56) References Cited

U.S. PATENT DOCUMENTS 3,254,981 A * 6/1966 Havens ........................ 65/359
3,961,927 A * 6/1976 Alderson et al. ............ 65/25.1
4,546,811 A * 10/1985 Potard ........................ 164/66.1
5,873,921 A * 2/1999 Hirota et al. ................. 65/25.1

FOREIGN PATENT DOCUMENTS

DE           10149400        * 2/2003

* cited by examiner

*Primary Examiner*—Steven P. Griffin
*Assistant Examiner*—Carlos Lopez
(74) *Attorney, Agent, or Firm*—Baker & Daniels

(57) ABSTRACT

The invention relates to a method for the hot shaping of molten gobs on a mold base by interposing a gas bed, comprising the following method steps.

According to the invention such a method comprises the following method steps:
  a mold base made of open-pore mold material is produced;
  the supporting surface of the mold base is coated permanently with a glass contact material;
  such a coating material is chosen or the coating is arranged in such a way that the layer comprises open pores after its application which allow a gas-conductive connection between the lower side and the upper side of the layer;
  the mold base is charged with a gas in order to produce a gas bed on the upper side of the layer.

4 Claims, No Drawings

METHOD FOR THE HOT SHAPING OF MOLTEN GOBS

The invention relates to a method and an apparatus for the storage and hot shaping of molten gobs.

The gas bed storage of molten gobs is a technique that has been established for a long period of time. The gob is stored on the gas bed, which leads to technical advantages concerning the temperature balance and thus the homogeneity and surface quality of the glass product thus produced.

There are principally two methods to produce a gas bed:

According to a first method, a porous mold base is saturated with a liquid that will evaporate at the process temperature (usually water). The thus arising gas cushion prevents the direct contact between the mold and the gob. The disadvantageous aspect in this method is that the vaporizable liquid needs to be re-applied after each pass, thus limiting the possibilities for a continuous working method. Moreover, the formation of such a vapor cushion is time-dependent and consequently leads to an uneven thermal household, which impairs the process stability.

According to a second method the porous mold base is flowed through continuously by a gas and thus produces a temporally stable gas bed which prevents the contact between the glass surface and the material of the mold. The only problematic moment is the one in which the gob is introduced into the mold, which usually occurs in free fall. As a result of the drop impulse, a short-time contact occurs in this case and thus an at least occasional adherence or gluing of the gob on the material of the mold. In the case of a rapidly progressing continuous process the occasional adherence is a serious problem because a) it leads to reduction in yield due to the thus produced adverse surface quality;

b) it increases the wear and tear of the molds, and c) it reduces process stability.

If the flow resistance of the porous mold is high, it is necessary to work with relatively high gas pressures due to the thus caused drop in pressure, leading to relatively high operating costs. Moreover, there is the likelihood of a mold breakage, because the pressure load acting upon the mold is relatively high. It is known, on the other hand, that a certain minimum differential pressure is necessary for the even formation of the stablest possible gas film, which can be achieved most economically by a mold base with relatively low values for the gas permeability, but with the evenest possible distribution of pores over the surface.

Various approaches have been taken in order to avoid the adherence between the glass surface and the supporting surface of the mold base.

Molds of noble metals of the first and eighth subgroup of the periodic table of elements do not have the tendency towards adherence and gluing in the case of direct contact between hot glass and mold; such molds are very expensive, however, and therefore lead in most cases to a lack of cost-effectiveness of the entire process.

One has also used base metals or their alloys as porous mold bases. These materials tend to the formation of scaling particles due to the high temperatures which could reach into the glass. Moreover, the pore structure of the mold base can change by scaling. Moreover, in mold bases made of metal with oxidized surfaces there is a higher tendency towards adherence and gluing of the gobs. For this reason base metals or their alloys are unsuitable for the porous mold material.

There is no tendency towards adherence and gluing of the gobs in a mold base made of graphite, which is why graphite is also frequently used.

Due to its high corrosive tendency with respect to air, graphite is very limited in its application temperature.

Although ceramics such as silicon carbide or cordierite could be used due to their high temperature resistance, there is still an adherence or gluing of the gob already at relatively low temperatures.

The invention is based on the object of providing a method and an apparatus with which molten gobs can be stored by means of gas bed storage on a porous mold base and can be subjected to hot shaping without the occurrence of any gluing or adherence of the gob on the supporting surface of the mold base. The method and apparatus are to be cost-effective. Especially, the mold base is to be durable and inexpensive to produce, so that it can be used frequently over long periods. This object is achieved by the features of the independent claims.

The invention is thus based on the known method for hot shaping, with a porous mold base being used. Said base is provided with open pores which can be flowed through by gases which on their part emerge from the supporting surface of the mold base and form a gas bed there. According to the invention, the supporting surface of the mold base facing the gob is coated with a material which due to its properties, and especially its thermal and chemical resistance, ensures a stable process. The layer is used especially as an anti-stick means which does not stick or adhere to the gob itself. This leads to the advantage that the mold base can be made of any other material irrespective of its tendency to adhere or glue. A relatively inexpensive material such as a base metal can be used.

Moreover, the said layer is arranged and/or chosen in such a way that gas passing through the pores of the mold base can also pass through the layer. In order to realize this it is possible to employ various approaches in accordance with the invention. Thus a layer material can be used which shows porosity itself. Porous layer materials can thus also be applied in larger thicknesses on the supporting surface of the mold base because its cross-flow capabilities are always ensured in the applied state. It may also concern material in which the pores only form during the application.

It is also possible to apply a layer which is very thin and consists of noble material or a noble metal alloy. This excludes the problem linked to adherence or gluing completely and the long-term stability of the mold material is improved significantly. The noble metal coating is applied by a suitable method in such a thin manner that the pore structure (porosity and pore size distribution) of the mold material is maintained. Pore structures which are favorable for the mold material lie at 5 to 20% by volume at $d_{50}$ values for the pore diameter between 2 and 100 $\mu$m.

An asymmetric pore structure of the mold material is produced in a further embodiment of the method in accordance with the invention. This means that the mold material facing the gob has significantly finer (e.g. $d_{50}$ value smaller by a factor of 2) pore sizes than the stability-maintaining and coarser pore structure beneath. Depending on the application, the pore size range on the glass contact side is between 0.5 and 50 $\mu$m ($d_{50}$ value). Three advantages are obtained by this arrangement:

1. The relatively fine pore structure of the side facing the gob causes substantially smaller mechanical surface faults even in the case of occasional glass contact.

2. The fine-porous layer does not have any stability effect; this is assumed by the coarse-porous layer. Due to the low layer thickness of the fine-porous layer the cross-flow resistance of the mold as compared with a mold consisting consistently of fine-porous material is strongly reduced, which can be noticed by a reduced pressure loss of the levitation gas and thus a lower susceptibility to faults of the process (e.g. by mold breakage) and by a reduction of the operating costs.

3. The gas distribution through a fine-porous layer is more homogenous at comparable porosity than in a coarser pore structure. This contributes towards an improved surface quality of the glass product thus produced.

Principally, the asymmetric mold materials can differ from one another in such a way that the coarse and fine structure have chemical compositions that are either the same (ceramics—ceramics or noble metal—noble metal) or different (preferably fine-porous noble metal layer on coarse-porous ceramics or coarse base metal such as stainless steel).

The application of porosity-maintaining stainless steel layers on the coarse-porous substrate can be made by the usual methods applicable for this purpose such as by sputtering, spraying, immersing or separation from solutions or suspensions.

The asymmetric structures can be produced by a method usually employed for this purpose (such as by spraying or by sintering together two prefabricated mold bodies of different porosity with respectively adjusted geometry). The relevant aspect is only that the thickness of the fine-porous layer is not more than 20% of the overall thickness of the asymmetric structure. A porosity-maintaining coating made of noble metal for reducing the adhesive tendency can be additionally applied onto such a fine-porous layer (if it consists of a ceramic material or a base metal).

It is also possible to only produce the pores of the layer after its application on the supporting surface of the mold base in the case of any kind of coating material, i.e. before a gob is applied. This is performed for example by gassing prior to the startup of the unit. Gas emerges from the pores of the mold base, produces fine bores in the layer as a result of the energy of the fine gas jets, which bores are maintained during the hardening of the layer, so that a gas bed is able to form between the surface of the layer and the gob.

In any case, both the material of the mold base as well as the material of the coating must meet all requirements placed on the process. These materials must be especially heat-resistant.

It is only thus possible to subject molten gobs to a contact-free shaping with the method and apparatus in accordance with the invention. It allows producing semifinished glass goods with a fire-polished surface in a continuous and cost-effective way. The shape of the semifinished glass goods comes close to the final shape. The method and the apparatus are especially suitable for producing optical lenses, as well as planar bodies. The direct contact between the mold base and the gob is reliably prevented, so that the glass surface is completely free from faults. Even an occasional contact between mold base and gob such as during the filling of the mold base with molten glass has no serious consequences on the product quality and the service life of the mold base.

It is appropriate to arrange the apparatus in such a way that the layer has a finer microporosity than the mold base.

It is further appropriate that the microporosity is between 0.1 and 20% by volume, preferably between 4 and 15% by volume.

It is further appropriate that the open-pore mold material is a refractory metal.

It is further appropriate that the porous refractory metal is from the group of NiCrAl or FeCrAl alloys.

Suitable mold materials are principally all ceramics or refractory metals insofar as the same have a sufficient temperature stability and resistance to thermal shocks.

The mold materials are produced prior to their coating with the help of the usually employed processes (compaction and shaping of a respective powder with subsequent sintering and optional finishing) in porous form.

Cordierite and silicon carbide are particularly suitable from the material group of ceramics. Especially NiCrAl or FeCrAl alloys can be used especially advantageously from the group of refractory metals due to their high temperature stability.

What is claimed is:

1. A method for the hot shaping of molten gobs on a mold base by interposing a gas bed, comprising the following method steps:

producing a mold base made of open-pore mold material;

coating a supporting surface of the mold base permanently with a glass contact material layer;

the glass contact material is chosen or is arranged in such a way that the layer comprises open pores after its application which allow a gas-conductive connection between a lower side and an upper side of the layer;

charging the mold base with a gas in order to produce a gas bed on the upper side of the layer.

2. A method as claimed in claim 1, characterized in that the layer is applied with such a low thickness that the pore structure of the mold base is maintained.

3. A method as claimed in claim 1, characterized in that the layer is applied onto the mold base by sputtering, spraying, immersing or separation from solutions or suspensions.

4. A method as claimed in claim 2, characterized in that the layer is applied onto the mold base by sputtering, spraying, immersing or separation from solutions or suspension.

* * * * *